United States Patent [19]

Hannah

[11] 4,438,667

[45] Mar. 27, 1984

[54] SHARPENING DEVICE FOR A CHAIN SAW

[76] Inventor: Voris E. Hannah, Rte. 1, Wingo, Ky. 42088

[21] Appl. No.: 368,638

[22] Filed: Apr. 15, 1982

[51] Int. Cl.³ .............................................. B23D 63/16
[52] U.S. Cl. ...................................... 76/36; 76/25 A
[58] Field of Search ...................... 76/25 A, 36, 31, 74

[56] References Cited

U.S. PATENT DOCUMENTS 2,861,349  11/1958  Olson et al. .............................. 76/36
3,543,612  12/1970  Silvon ................................. 76/25 A Primary Examiner—Roscoe V. Parker
Attorney, Agent, or Firm—Stephen F. Jewett

[57] ABSTRACT

A sharpening device for supporting a file for sharpening the cutting elements of a chain saw. The device includes a base portion that is removably secured to the chain bar of the chain saw, and a top guide portion slidably mounted on the base portion and for supporting the file. The top guide portion moves between a first position at the chain for sharpening one of the cutting elements and a second position away from the chain to permit indexing of the chain to locate another cutting element for sharpening. In one embodiment, the base portion includes two sidewalls, and the chain bar is clamped between the sidewalls. In an alternate embodiment, the base portion includes a magnet for holding the base portion to one side of the chain bar, and further includes two flat pins that project from the base portion for resting on the chain bar.

13 Claims, 8 Drawing Figures

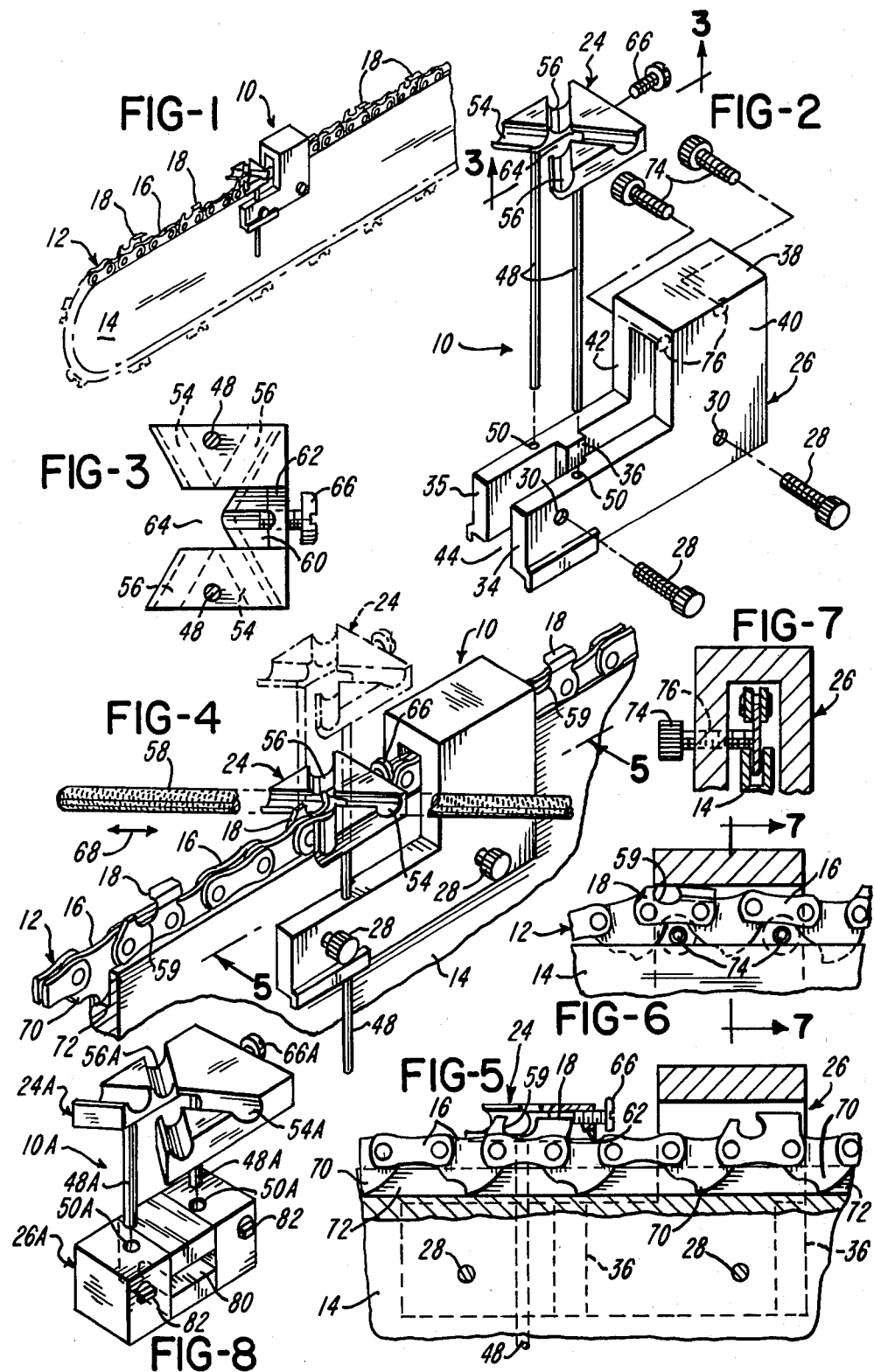

SHARPENING DEVICE FOR A CHAIN SAW

BACKGROUND OF THE INVENTION

The present invention relates to sharpening devices and, more particularly, to a device for sharpening the cutting elements of a chain saw.

A chain saw, like any cutting or sawing tool, becomes worn after normal use and requires sharpening. Devices that can be used to sharpen the cutting elements of a chain saw are known in the art, and often include a file and a file guide for supporting the file. The file guide is constructed so that the file is held in the proper position for filing each cutting element of the chain.

A common problem encountered with many of the known sharpening devices is that they often do not accurately file the cutting elements so that, after sharpening, the cutting elements cut with the same efficiency that they had prior to becoming worn. To accurately sharpen the cutting elements requires both that the file be positioned to file or remove the same amount from each cutting element, and that it be positioned at exactly the same angle when filing every similar cutting element on the chain. While some prior sharpening devices are able to properly and precisely position the file, such devices typically have numerous dials and knobs, resulting in the devices being both expensive to manufacture and difficult to use.

There has arisen, therefore, the need for a chain saw sharpening device that not only accurately positions a file for sharpening each cutting element of the chain saw, but that is also easy to use and inexpensive to manufacture.

SUMMARY OF THE INVENTION

There is provided, in accordance with the present invention, a sharpening device for a chain saw, the device supporting and accurately positioning a file for filing each cutting element on the chain of the saw. The file guide includes a base portion that is removably secured to a chain support bar of the saw, and a top portion that guides the file.

The top portion of the device is mounted for sliding movement relative to the base portion and relative to the chain bar and chain. This movement is in a direction transverse to the direction that the chain travels on the chain bar when sawing, and permits the top portion to be moved from a first position at the chain, when a cutting element is to be sharpened, to a second position away from the chain, when the chain is to be indexed to present another cutting element for sharpening.

The top portion has guide means in the form of two grooves, formed on the top side of the top portion for confining the file for longitudinal reciprocating sliding movement in order to sharpen the cutting element positioned at the device. The top portion further has a slot formed on the bottom side thereof for receiving and confining the cutting element to be sharpened, and link positioning means in the form of a screw threadedly received in a depending wall that closes one end of the slot. The screw is in abutment with the cutting element to be sharpened, and by turning the screw, there is permitted adjustment of the position of the cutting element in order to control the amount filed off the cutting element during sharpening.

The top portion also has two depending pins that are received for sliding movement in longitudinal bores in the base portion. The sliding movement of the pins within the longitudinal bores permit the movement of the top portion relative to the base portion between the previously mentioned first and second positions.

In one embodiment, the base portion has two side walls that define a channel therebetween for receiving the chain and chain bar, including the cutting element on the chain that is to be sharpened. The longitudinal bores for receiving the depending pins of the top portion are one in each of the two side walls so that the top portion straddles the chain bar. The base portion is secured to the chain bar by two screws threadedly received in one of the side walls. The chain bar is clamped between the screws and the other side wall.

In another embodiment, the entire base portion is positioned on one side of the chain bar, and the base portion is secured to the chain bar by the magnetic attraction between the chain bar and a magnet in the base portion. The two depending pins from the top portion are received in the longitudinal bores of the base portion so that the top portion is positioned over the chain bar.

It is, therefore, an object of the present invention to provide an improved sharpening device for a chain saw.

It is another object of the present invention to provide a sharpening device that includes a file and means for supporting and guiding the file, so that the file will accurately sharpen each cutting element of the chain saw.

It is still another object of the present invention to provide a sharpening device for a chain saw, wherein the device supports a file for accurately filing the same amount off each cutting element.

Still a further object of the present invention is to provide a file guide in accordance with all the preceding objects, which can be both inexpensively manufactured and easy to use.

These and other objects of the present invention will become more apparent when taken in conjunction with the attached drawings and the following description.

BRIEF DESCRIPTION OF THE DRAWINGS

FIG. 1 is a fragmentary perspective view of a sharpening device in accordance with the present invention, the device being mounted on the chain support bar of a chain saw.

FIG. 2 is an enlarged exploded perspective view of the sharpening device seen in FIG. 1.

FIG. 3 is a partly sectioned bottom view of the top guide portion of the sharpening device, as viewed along the line 3—3 of FIG. 2.

FIG. 4 is an enlarged fragmentary perspective view of the sharpening device and the chain support bar seen in FIG. 1, illustrating the operation of the sharpening device.

FIG. 5 is a partial side sectional view of the sharpening device and the chain support bar, as viewed along line 5—5 of FIG. 4, after the sharpening device has been secured to the chain support bar and the guide positioning screws withdrawn.

FIG. 6 is a partial sectional view of the base portion of the sharpening device and the chain support bar, illustrating the use of the guide positioning screws to locate the base portion on the chain bar.

FIG. 7 is a partial sectional view taken along line 7—7 of FIG. 6.

FIG. 8 is a perspective view of an alternate embodiment of a sharpening device in accordance with the present invention.

DETAILED DESCRIPTION OF THE PREFERRED EMBODIMENTS

Referring to FIG. 1, there is illustrated a file guide or sharpening device 10 in accordance with the present invention, with the device 10 shown mounted on a chain support bar 14 of a chain saw. The sharpening device 10 is used to sharpen a chain 12 that is supported for travel about the periphery of the bar 14 when the chain saw is in operation for sawing. The portion of the chain saw illustrated is for exemplary purposes only, it being understood that chains of different construction can be sharpened in accordance with the present invention. The chain 12 shown in FIG. 1 is conventional, having a plurality of links 16, some of which are cutting links or elements 18 that become worn during use and that are sharpened by the device 10 in a manner to be described below.

FIGS. 2 and 3 illustrate in greater detail the construction of the sharpening device 10. As seen best in FIG. 2, the device 10 includes a top file guide portion 24 and a base support portion 26. The base portion 26 is secured to the chain bar 14 by two mounting thumb screws 28. The screws 28 are threadedly received in two apertures 30 that are spaced apart on one of two opposing side walls 34 and 35 of the base portion 26. When the base portion 26 is properly positioned on the chain bar 14 (in a manner to be described later in conjunction with FIG. 6 and 7), the screws 28 may be manually turned to clamp the chain bar between the shanks of the screws 28 and vertical spacing bosses 36 (only one of which is seen in FIG. 2) on the sidewall 35, thereby securing base portion 26 to the chain bar 14.

The two sidewalls 34 and 35 are joined by a horizontal bridging wall 38 at upright portions 40 and 42 on each of the sidewalls 34 and 35, respectively. The space between the opposing sidewalls forms a channel 44 into which chain bar 14 fits when clamped. The bosses 36 cooperate with the screws 28 to position the chain bar 14 equidistantly from the sidewalls 34 and 35.

The top portion 24 of the sharpening device 10 includes two elongated depending pins 48 that are slidably received in vertical bores 50 in each of the sidewalls 34 and 35 of the base portion 26. The top portion 24 is thus supported for vertical sliding movement between a first, lower position, in which the top portion 24 rests on the chain 12 for sharpening one of the cutting elements 18, and a second, upper position away from the chain 12, to permit indexing of the chain for positioning another of the cutting elements 18 for sharpening.

The top side of the top portion 24 (i.e., the side opposite the chain 12) has intersecting rounded grooves or slots 54 and 56 that can each support a file 58 (seen only in FIG. 4) for reciprocating sliding movement therein. The slots 54 and 56 are formed in the top portion 24 to support the file 58 for movement in a direction which is at the exact angle required to sharpen the cutting edge 59 (seen best in FIGS. 4, 5, and 6) on each of the cutting elements 18. As is the case with most conventional chain saws, the cutting elements 18 on chain 12 have alternating and oppositely facing cutting edges 59 with the cutting elements 18 positioned on both sides of chain 12. Thus both of the slots 54 and 56 are needed to sharpen all of the cutting elements 18.

The top guide portion 24 has a positioning slot 60 on the bottom side thereof (i.e., the side closest the chain 12) that is seen best in FIG. 3 and that extends from a depending back wall 62 to the front of the top guide portion 24. At the front of the top guide portion 24 (toward the left as viewed in FIG. 3), the slot 60 opens into an opening 64, which is at the juncture or intersection of the grooves 54 and 56 and which is where the cutting edge of each cutting element 18 is positioned for sharpening by the device 10. The slot 60 is sufficiently wide to accommodate alternating cutting elements on either side of the chain 12 as the chain is indexed to sharpen each cutting element 18.

A link positioning screw 66 is threadedly received in the back wall 62 of the top guide portion 24 and extends into the slot 60. As will be more fully described later, the screw 66 helps position each cutting element 18 for proper and consistent sharpening.

The operation of the device 10 when used to sharpen the cutting elements 18 of the chain 12 will now be described with particular reference to FIGS. 4 and 5. As seen in FIG. 4, the previously mentioned file 58 can be slidably supported in one of the slots 54 and 56 when one of the cutting elements 18 is in position for sharpening at the opening 64. Specifically, the file 58 is shown in slot 54 in FIG. 4 so that the file can be used to sharpen one of the cutting elements 18 that is on the far side (as viewed in the drawings) of the chain 12. The file 58 would be placed in slot 56 in order to sharpen one of the cutting elements 18 on the near side of the chain 12.

When positioned in either of the slots 54 or 56, the file 58 is manually moved back and forth longitudinally in the direction of arrow 68 to sharpen the cutting element positioned at the device 10. While the direction of movement will depend on the alignment of slot 54 (or slot 56), it is generally transverse to the direction of travel of chain 12 about the chain bar 14. After the file 58 has filled a sufficient amount off the cutting element 18, which would normally be indicated by the file 58 sliding in the slot 54 with little or no resistance, file 58 is removed from slot 54 and the top guide portion 24 can be raised from its lower position to its upper position shown in phantom in FIG. 4. The chain 12 can then be manually indexed to position the next cutting element at the device 10.

The chain 12, as seen best in FIG. 5, has depending teeth 70 on every other one of the links 16. The teeth 70 slide in a channel 72 formed about the periphery of the chain bar 14 when the chain saw is operational and when the chain is being indexed. After the chain is indexed to position a new cutting element for sharpening, the top guide portion 24 is brought down to its lower sharpening position, as seen in FIG. 5. To place the cutting element 18 in exact position for sharpening, the cutting element may need to be moved slightly, until the end of the link (toward the right as viewed in FIG. 5) abuts the end of the screw 66. Every cutting element is positioned against the screw 66 in the same fashion, to assure that each is filed to the same extent.

FIGS. 6 and 7 illustrate the manner in which the sharpening device 10 is properly positioned for being secured to the saw bar 14.

The base guide portion 26 is first placed in a straddling fashion over the chain bar 14 so that the chain 12 and the chain bar 14 are both within the channel 44 of the base portion 26. Two base positioning screws 74 that are threadedly received in apertures 76 in the base portion 26 extend into the channel 44 so they are above the chain bar 14. As seen best in FIG. 6, the chain 12 is lifted slightly up from the chain bar 14 and the base portion 26 is positioned so that the shanks of the screws 74 rest on the periphery or top of the bar 14. The base portion 26 is then properly positioned for being secured to the chain bar, and the thumb screws 28 are turned to clamp the chain bar between the sidewalls 34 and 35 as previously discussed. The base positioning screws 74 are then withdrawn, and the chain lowered to its normal position on the chain bar.

In FIG. 8 there is shown a sharpening device 10A that represents an alternate embodiment of the present invention. The device 10A includes a top guide portion 24A and a lower base portion 26A. The device 10A is constructed much like the device 10 of FIGS. 1 through 7. For example, the top portion 24A has slots 54A and 56A for supporting a file for sliding longitudinal movement, and a link positioning screw 66A for accurately positioning each cutting element that is to be sharpened. The top portion 24A also has two depending pins 48A. The base portion 26A includes a U-shaped magnet 80 that secures the base portion 26A to chain bar 14. As should be apparent, the base portion is held to one side of the chain bar 14 by the magnetic attraction of the magnet 80 to the chain bar. Two bores 50A in the base portion receive the pins 48A so that, like the sharpening device 10, the device 10A is moveable between lower and upper positions.

Two flat pins 82 extend from the side of the base portion 26A and are used to accurately position the base portion on the chain bar 14. The flat pins 82 rest on the top of the chain bar when the magnet 80 holds the base portion to the chain bar. The pins 82 project only a slight distance from the side of the base portion 26A so that they do not interfere with the chain 12 as it is indexed to present each new cutting element for sharpening.

The pins 82 also act, in conjunction with the magnet 80, to hold the base portion 26A in place and to prevent the base portion from creeping or slipping on the chain bar as the file is moved in the grooves 54A and 56A on the top portion 24A.

It should be apparent from the foregoing description that the sharpening devices 10 and 10A are both the inexpensive to manufacture and easy to use. In the device 10, the guide positioning screws 74 provide a means to quickly position the file guide device, and the mounting thumb screws 28 are provided to quickly and easily secure the sharpening device to the chain bar. These functions are accomplished in an even simpler fashion by the magnet 80 and the pins 82 in the device 10A.

Further, the sliding movement of the top guide portions 24 and 24A, relative to their respective base portions 26 and 26A, permits the chain to be readily indexed without having to either remount the base portion on the chain bar or to reset any adjustments made for sharpening. Finally, the link positioning screws 60 and 60A on the top guide portion assure that each cutting element is positioned in the same fashion for sharpening so that the same amount is filed off each cutting element.

Although the presently preferred embodiments of the present invention have been described, it should be appreciated that within the purview of the present invention various changes may be made within the scope of the appended claims.

I claim:

1. A sharpening device for guiding and supporting a file for sharpening the cutting elements of a chain saw, the chain saw having a chain bar about which a chain having the cutting elements travels, the sharpening device comprising:
    a top guide portion for supporting the file and including at least one pin projecting therefrom; and
    a base portion, said base portion including means for removably securing said base portion to the chain bar and means for supporting said top portion for movement from a first position adjacent the chain for sharpening one of the cutting elements located at the sharpening device to a second position away from the chain to permit indexing of the chain to locate another of the cutting elements at the sharpening device, said means for supporting said top portion including a bore in said base portion for receiving said pin for longitudinal sliding movement therein.

2. The device of claim 1, wherein said means for supporting said top guide portion supports said top guide portion for movement between the first and second positions in a direction transverse to the direction of travel of the chain.

3. The device of claim 1, wherein said top guide portion includes link positioning means for abutment with the one of the cutting elements at said sharpening device, said link positioning means moveable in the same direction as the travel of the chain to adjust the position of the one of the cutting elements at the sharpening device when sharpened to control the amount to be filed from the cutting element.

4. The device of claim 3, wherein said top guide portion includes support means for supporting said file for longitudinal reciprocating movement for filing the one of the cutting elements at the sharpening device when said top guide portion is at the first position.

5. The device of claim 4, wherein said support means includes a groove formed on said top guide portion, said file confined in said groove for longitudinal movement in a direction transverse to the direction of travel of the chain.

6. The device of claim 3, wherein said top guide portion has a slot for receiving the one of the cutting elements at the sharpening device, and wherein said link positioning means includes a depending wall closing one end of said slot and a screw threadedly received in said depending wall and extending into said slot for abutment with the one of the cutting elements at the sharpening device.

7. The device of claim 1, wherein said base portion includes two side walls defining a channel therebetween for receiving the chain bar and the chain.

8. The device of claim 7, further including base positioning means for positioning said base portion on the chain bar and base mounting means for removably mounting said base portion on the chain bar, said base positioning means extending from one of said side walls on said base portion for permitting said base portion to rest on the chain bar, said base mounting means for clamping the chain bar between said side walls after said base portion rests on the chain bar.

9. The device of claim 8, wherein said base positioning means comprises at least one base positioning screw having a shank extending from one of said sidewalls into said channel so that the shank of the base positioning screw may rest on the chain bar, and wherein said base mounting means comprises at least one mounting screw having a shank extending from one of said sidewalls for clamping the chain bar between the shank of the mounting screw and the other of said sidewalls.

10. The device of claim 7, wherein said means for supporting said top guide portion further includes a second bore for receiving a second pin projecting from said top guide portion, with one of said first-mentioned bore and said second bore in each of said two sidewalls of said base portion so that both said base portion and said top guide straddle the chain bar.

11. The device of claim 6, wherein said means for removably securing said base portion to the chain bar comprises magnetic means in said base portion for creating a magnetic attraction between said base portion and the chain bar and wherein said means for removably securing further comprises at least one flat pin projecting from said base portion for resting on the chain bar.

12. The device of claim 11, wherein said flat pin projects only a short distance so that when resting on the chain bar it does not interfere with the travel of the chain on the chain bar.

13. The device of claim 11, wherein said magnetic means holds said base portion at one side of the chain bar, and wherein said means for supporting said top guide portion further includes a second bore in said base portion for receiving a second pin projecting from said top guide portion, so that said top guide portion is supported above the chain.

* * * * *